3,153,180
ELECTRICAL CAPACITOR AND METHOD OF MAKING THE SAME
Arthur J. Bellmore, Hudson Falls, N.Y., assignor to General Electric Company, a corporation of New York
Filed Nov. 15, 1961, Ser. No. 152,543
8 Claims. (Cl. 317—260)

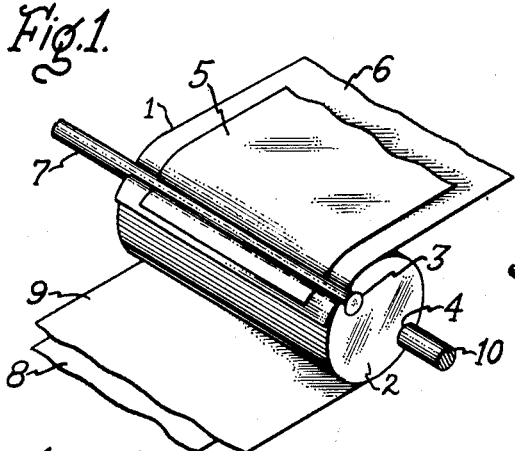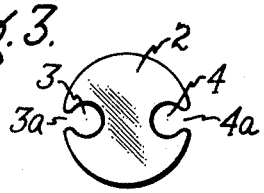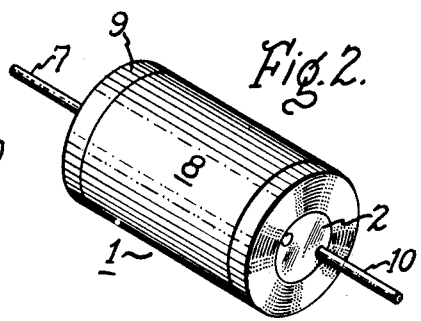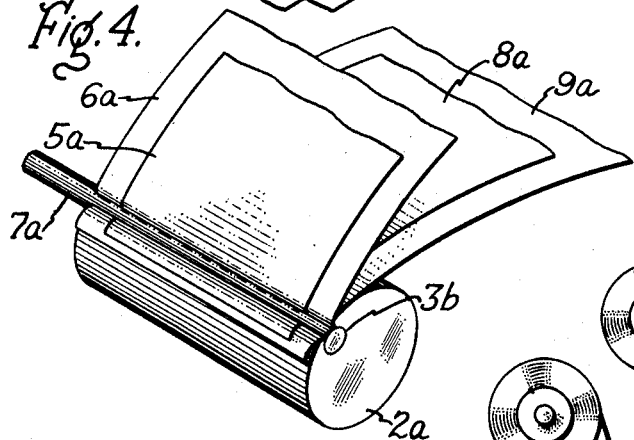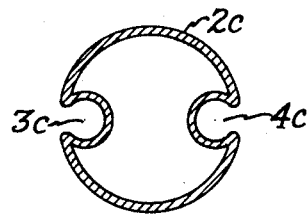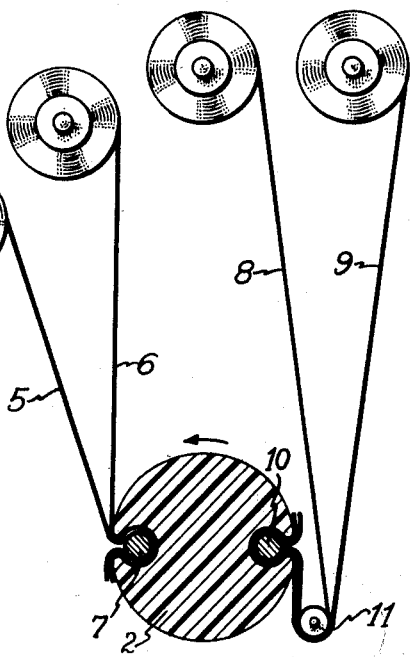
Inventor,
Arthur J. Bellmore,
by Sidney Greenberg
His Attorney.

The present invention relates to electrical capacitors, and more particularly concerns an improved arrangement for winding rolled type capacitors.

In the past, rolled type capacitors have been conventionally wound on arbors from which the finally wound capacitors were removed. This procedure has the drawback that sliding the wound capacitor off the arbor frequently resulted in damage to the portion of the capacitor coil in contact with the arbor. A further disadvantage is that such capacitors are left with an interior hole having nothing therein to support the roll, and consequently there was risk of the capacitor roll being deformed during subsequent handling.

Attachment of the leads to the respective electrodes in the capacitor also presents a substantial problem, and present practices employed in firmly securing the terminal leads to the electrodes often involve cubbersome and expensive operations in order to effectively secure the leads.

It is an object of the invention to provide an improved capacitor, winding arrangement and method which overcome the above and other disadvantages.

It is another object of this invention to provide a simple and efficient attachment of the capacitor roll components to the mandrel on which they are wound into a compact roll.

It is a further object of this invention to provide a simple and inexpensive yet effective attachment of the electrodes of wound capacitors to their terminal leads.

It is still a further object of the invention to provide a capacitor of the above type wherein the lead members secured to the respective electrodes of the wound capacitor simultaneously serve to anchor the capacitor components during winding.

Other objects and advantages will become apparent from the following description and the appended claims.

With the above objects in view, the present invention relates to an electrical capacitor comprising a core member having a surface on which a coil is adapted to be wound, the surface being formed with securing means, a superposed assembly of a pair of electrodes and interposed dielectric sheets, a portion of the assembly being in contact with the securing means, and combined holding and conductive lead means in contact with at least one of the foil electrodes and projecting laterally beyond the edge thereof, the combined holding and conductive lead means co-acting with the securing means for firmly securing the superposed assembly of foil electrodes and dielectric sheets to the core member, whereby a tight roll of the electrodes and dielectric sheets may be formed by winding the same on the core member.

The invention will be better understood from the following description taken in conjunction with the accompanying drawing, in which:

FIGURE 1 is a perspective fragmentary view of the components of a rolled type capacitor as they are arranged in accordance with the invention prior to winding;

FIGURE 2 is a perspective view of the FIGURE 1 capacitor in fully wound form;

FIGURE 3 is an end view of the core member of the device of FIGURES 1 and 2;

FIGURE 4 is a fragmentary view showing a modification of the arrangement illustrated in FIGURE 1;

FIGURE 5 is a schematic view showing the manner in which the capacitor of the invention may be wound; and FIGURE 6 is an end view of a modified form of core member.

Referring now to the drawing, and particularly to FIGURE 1, there is shown, prior to winding, components of a roll-type capacitor 1 including core member 2 of substantially cylindrical shape and composed in a usual case of insulating material such as a synthetic resin. Core member 2 has formed in its circumferential surface a pair of longitudinal grooves or slots 3 and 4 extending the length of the core member. Foil electrode 5 and dielectric sheet 6 are secured adjacent their free ends in superposed relation in slot 3 by conductive lead wire 7 which is snapped into place within the slot in contact with electrode foil 5 and thereby clamps electrode foil 5 and dielectric sheet 6 within the slot as shown to firmly secure the same to core member 2. Similarly, electrode foil 8 and dielectric sheet 9 are clamped within slot 4 by conductive lead wire 10, with the latter in contact with foil 8. Electrode foils 5 and 8 may be of any known or suitable metal such as aluminum or other conducting material, and dielectric sheets 6 and 9 may be of any known or suitable type of insulating sheet material such as kraft paper. As shown, the dielectric sheets 6 and 9 are wider than electrode foils 5 and 8 and extend beyond the edges thereof to avoid the risk of short-circuits between the electrodes of different polarity. Lead members 7 and 10 may be ordinary metallic wires such as copper, and when snapped into the respective slots 3 and 4 in contact with the respective foil electrodes 5 and 8 as shown, serve as combined holding and lead means for the capacitor unit.

If desired, the FIGURE 1 embodiment may be modified by exposing the edges of foils 5 and 8 at opposite ends of the roll toward the projecting ends of their respective leads 7 and 10. By having the turns of the respective foils contact each other in such a modification, series resistance is reduced, especially in large rolls. In such arrangement, the non-projecting ends of the leads 7 and 10 would be offset inwardly to avoid short-circuiting the foils of opposite polarity.

FIGURE 2 shows the fully wound capacitor after the assembly shown in FIGURE 1 is wound about core member 2.

As shown more clearly in FIGURE 3 in which an end view of core member 2 is illustrated, slots 3 and 4 have an interior circular configuration complementary to the size and shape of wire leads 7 and 10 to be received therein, but the passages or openings 3a and 4a leading to the interior of each slot are smaller than the diameter of the slots, so as to securely retain the leads in the slots. Openings 3a and 4a, however, are made sufficiently wide, taking into account the yieldable nature of the material of core member 2, to permit lead wires 7 and 10 to be snapped into place within the slots by manual pressure applied to force the leads through openings 3a and 4a. The diameter of slots 3 and 4 are such that when lead wires 7 and 10 are snapped into place therein they fit snugly in the slots, with the electrode and dielectric sheets between the lead wires and the inner surfaces of slots 3 and 4, and the electrode and dielectric sheets are firmly held within the slots by frictional contact, whereby when core member 2 is rotated about its axis, the electrode foils and dielectric sheets are wound into a tight coil.

While in the usual case nonconducting material is preferred for core member 2, it is not intended to limit the invention to such material, since in certain situations a core member of metal may be used if desired. An advantage of a solid metallic core, for example, is that it may serve where necessary as a heat sink for controlling the temperature developed by the capacitor in operation.

FIGURE 4 shows a modification of the FIGURE 1 device wherein only one of the lead members serves as a holding means for the entire superposed foil and dielectric sheet assembly. In this embodiment, core member 2a is provided with a single slot 3b in which all of the foil electrodes and dielectric sheets are clamped to the core member by conducting lead member 7a, with the latter in electrical contact with foil 5a. In this embodiment, the other electrode foil 8a will normally have a tap strap (not shown) attached thereto elsewhere along its length, in accordance with conventional procedures. Alternatively, foil 8a may be arranged so that its lateral edge is exposed at the end of the roll opposite that at which lead 7a projects, and the thus exposed edge may have a lead attached thereto in known or conventional fashion. In such arrangement, the end of lead 7a opposite the projecting end would be offset inwardly to avoid shorting foil 8a.

Referring to the FIGURE 1 device, in the case where core member 2 is made of metal or other conducting material, the ends of leads 7 and 10 opposite their projecting ends would be offset inwardly of the end faces of the core member, so as to be protected by the respective dielectric sheets 6 and 9 from coming into a short-circuiting connection via the metallic core member. Alternatively, dielectric sheets 6 and 9 may be extended laterally beyond the end faces of core member 2 to provide such protection.

FIGURE 5 is a schematic showing of an arrangement by which the capacitor assembly of FIGURE 1 may be wound into coil form. With conducting lead 7 gripping foil 5 and dielectric sheet 6 in one slot of core member 2, and conducting lead 10 gripping foil 8 and dielectric sheet 9 in the other slot of core member 2, core member 2 is rotated in the direction indicated by the arrows, so that superposed foil 5 and dielectric sheet 6 are wound about the surface of core member 2 directly from supply rolls thereof, while superposed foil 8 and dielectric sheet 9 are wound about the surface of core member 2 by way of spindle 11 from supply rolls of the same, as illustrated in FIGURE 5. The core member may be readily rotated by any desirable means (not shown), such as by attaching a suitable rotating machine part to the end faces of the core member.

While a solid core member such as shown in FIGURE 3 is normally preferred for use in the capacitor in order to provide adequate support for the tightly wound capacitor roll and for other benefits, the invention also contemplates the use of hollow core members such as illustrated in FIGURE 6. The latter core member comprises a tubular member 2c formed of metal or other relatively strong material having its walls suitably shaped so as to provide slots 3c and 4c corresponding to those described previously, into which conducting lead wires may be snapped for holding the capacitor roll assembly components during winding in accordance with the invention. Such hollow core members will be found of advantage in those cases where it is desired, for example, to provide for the passage of cooling fluid through the center of the wound capacitor roll for controlling temperatures during operation of the capacitor.

It will be understood that the configuration of the slots formed in the core member may be other than circular as, for example, oval, square, or other shape which when used with conducting leads of complementary shape and size serve to grip the electrode and dielectric sheets in the manner described. It will also be understood that the core member may have a variety of shapes other than circular if so desired.

There is thus provided in accordance with the invention a simple, economical, yet effective means for securing the components of a wound capacitor to a central winding core, the securing means serving simultaneously as a conductive lead means in the finally wound capacitor. In addition, the conductive lead means has good electrical contact with its electrode foil without the need for special attaching procedures often used in the prior art for this purpose, such as welding, crimping, or the like. The disclosed arrangement obviates the need for removing the wound capacitor from the mandrel on which it is wound and, further, serves to provide permanent solid support for the wound capacitor, thereby avoiding the risk of deformed capacitor rolls which is attendant on the use of known capacitor winding arrangements.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising, in combination, a core member having a surface on which a capacitor roll is adapted to be wound, said surface being formed with at least one slot, said slot opening on said surface through a passage which is narrower than the interior of said slot, an assembly comprising a pair of electrode strips separated by a pair of dielectric strips wound into a coil about said core member, a portion of at least a pair of said electrode and dielectric strips lying within said slot with the electrode strip overlying the dielectric strip, and combined holding and conductive lead means in contact with said electrode strip snugly fitting into said slot for firmly securing said strips to said core member and projecting beyond the latter.

2. An electrical capacitor comprising, in combination, a core member having a surface on which a capacitor roll is adapted to be wound, said surface being formed with a pair of circumferentially spaced slots, each slot opening on said surface through a passage which is narrower than the interior of said slot, a pair of electrode strips separated by a pair of dielectric strips wound into a coil about said core member, a portion of one electrode strip and one dielectric strip lying within one slot and a portion of the other electrode strip and other dielectric strip lying within the other slot, the electrode strip lying uppermost in each slot, and combined holding and conductive lead means snugly fitting into each slot in contact with said electrode strip for holding the dielectric and electrode strips firmly secured to said core member and projecting beyond the latter.

3. An electrical capacitor as defined in claim 1, wherein the core member is solid.

4. An electrical capacitor as defined in claim 1, wherein the core member is hollow.

5. An electrical capacitor as defined in claim 1, wherein the core member is composed of insulating material.

6. An electrical capacitor as defined in claim 1, wherein the core member is metallic.

7. An electrical capacitor comprising, in combination, a core member having a surface on which a capacitor roll is adapted to be wound, said surface being formed with at least one slot, said slot opening on said surface through a passage which is narrower than the interior of said slot, an assembly comprising a pair of electrode strips separated by a pair of dielectric strips wound into a coil about said core member, a portion of at least a pair of said electrode and dielectric strips lying within said slot with the electrode strip overlying the dielectric strip, and combined holding and conductive lead means in contact with said last-mentioned electrode strip snugly fitting into said slot for firmly securing said strips within said slot to said core member and projecting beyond the latter.

8. An electrical capacitor comprising, in combination, a cylindrical core member having a surface on which a capacitor is adapted to be wound, said surface being formed with at least one slot, said slot opening on said surface through a passage which is narrower than the interior of said slot, an assembly comprising a pair of electrode strips separated by a dielectric layer wound into a coil about said core member, a portion of said electrode strips and dielectric layer lying within said slot with an electrode strip overlying the dielectric layer, and combined holding and conducting lead means in contact with said latter electrode strip snugly fitting into said slot for firmly securing said assembly to said core member and projecting beyond the core member.

References Cited in the file of this patent

UNITED STATES PATENTS

| | | |
|---|---|---|
| Re. 17,800 | Baker | Mar. 29, 1926 |
| 757,921 | Haycraft | Apr. 19, 1904 |
| 1,861,006 | Goodman | May 31, 1932 |
| 2,533,716 | Coursey | Dec. 12, 1950 |
| 2,776,413 | Knouse | Jan. 1, 1957 |
| 2,917,687 | Haas | Dec. 15, 1959 |
| 2,929,132 | Wohlieter | Mar. 22, 1960 |